(12) United States Patent
Ebina et al.

(10) Patent No.: US 6,501,558 B2
(45) Date of Patent: *Dec. 31, 2002

(54) DATA SEPARATING INTERFACE APPARATUS AND METHOD

(75) Inventors: Koichi Ebina, Nagano (JP); Tsutomu Nobutani, Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,873

(22) Filed: Aug. 5, 1999

(65) Prior Publication Data

US 2002/0018231 A1 Feb. 14, 2002

(30) Foreign Application Priority Data

Aug. 28, 1998 (JP) .............................. 10-243831

(51) Int. Cl.$^7$ ................................ G06F 15/00
(52) U.S. Cl. ........................ 358/1.15; 358/1.1
(58) Field of Search .................. 358/1.1, 1.9, 1.11, 358/1.12, 1.13, 1.14, 1.15, 1.17, 1.18; 705/23, 24; 400/605, 586, 588; 364/405, 464, 466, 518, 519

(56) References Cited

U.S. PATENT DOCUMENTS

| 4,712,929 A | * | 12/1987 | Kitaoka ..................... 400/76 |
| 5,080,513 A | * | 1/1992 | Clary ........................ 400/605 |
| 6,091,510 A | * | 7/2000 | Kazo ........................ 358/1.18 |

FOREIGN PATENT DOCUMENTS

| EP | 0219881 A2 | * | 4/1987 |
| JP | A-2-47077 | | 2/1990 |
| JP | A-6-243345 | | 9/1994 |
| JP | 06309563 A | * | 11/1994 |
| JP | A-9-35126 | | 2/1997 |
| JP | A-10-6615 | | 1/1998 |

* cited by examiner

Primary Examiner—Gabriel Garcia
(74) Attorney, Agent, or Firm—Nixon & Vanderhye P.C.

(57) ABSTRACT

An interface module waits for the arrival of data to be received from a host computer and decides whether the received data is journal print data. If the received data is journal print data, the interface module causes flash memory to store the data and if the received data is print data (e.g., receipt print data) other than the journal print data, the interface module transmits the fact to a printer. The interface module is fitted in the interface board slot of the printer.

15 Claims, 6 Drawing Sheets

DATA SEPARATING INTERFACE APPARATUS AND METHOD

This invention relates to printers, and more particularly to an interface module, a method of controlling the interface module, and an information record medium for recording programs for controlling the interface module.

BACKGROUND OF THE INVENTION

Accounting apparatus such as registers, receipt issuing machines and the like in retail trade are used for printing price statements, sales slips, receipts and the like to be given to customers by retailers. Therefore, these accounting apparatus are equipped with printers. Due to restrictions under the accounting and tax laws, retailers are often required to keep copies of such price statements, sales slips receipts and the like. These copies kept by retailers in the accounting apparatus are called journals.

In order to deal with the requirements above, a technique has been proposed that uses a two-sheet printer having two sets of character-graphic printers (a combination of a printhead, a platen, a paper feeder and the like) for printing receipts and journals separately. Another technique using a double sheet of paper using a carbon copy as what is intended to print a receipt and a journal is also used.

However, the technique of using the two-sheet printer equipped with two sets of character-graphic printers tends to increase the whole apparatus size and such a two-sheet printer is impossible to install in some retail stores whose store area is limited. There is also another problem arising from the fact that installation of the two sets of character-graphic printers will result in raising the production and maintenance costs.

Further, the technique of using a double sheet of paper also poses a problem in that paper cost tends to increase because printable paper is limited to carbon copy paper. Moreover, still another problem is that noise will be produced during the print operation because only an impact dot (wire dot) driving method for printing characters by pressing an ink ribbon against paper is usable for the printhead of the character-graphic printer.

In order to solve environmental problems arising from disposing carbon copy paper as well as dealing with the noise produced, there is a growing demand for not using a double sheet of paper but using a non-impact dot printhead (a thermal head ink-jet driving head and the like).

There is also an increasing demand for preserving not only journal data as the information printed on paper but also the data in the form of what can be processed by an information processor like a computer.

There is a further demand for saving precious paper resources by preserving the journal information in that form and dealing with the environmental problems by decreasing the amount of waste.

An object of the present invention intended to solve the foregoing problems is to provide an interface module which is fitted in the expanded slot of a printer and connected to a host computer, and used for extracting journal print data from the data received from the host computer in order to store the extracted data in a nonvolatile memory circuit and for extracting data for a record medium other than the journal print data and transmitting the extracted data to a printer in order to make the printer print a receipt. For example, the invention provides a method of controlling the printer; and an information record medium for recording programs for controlling the printer.

SUMMARY OF THE INVENTION

The present invention may provide one or more of the following features.

The present invention provides an interface module which is fitted in the expanded slot of a printer and connected to a host computer, and is used for extracting journal print data from the data received from the host computer in order to store the extracted data in a nonvolatile memory circuit and for extracting data for a record medium other than the journal print data and transmitting the extracted data to a printer in order to make the printer print a receipt. For example, the invention proposes a method of controlling the printer; and an information record medium for recording programs for controlling the printer.

In general, in one aspect, the invention features an interface module which is inserted into the interface board slot of a printer and includes receive structure for receiving data from a host computer, a journal-data extract device for extracting journal print data from the data received by the receive structure, a nonvolatile memory circuit for storing the journal print data extracted by the journal-data extract device, transmitted-data extract structure for extracting data to be transmitted to the printer from the data received by the receive structure, and a transmit device for transmitting to the printer the transmitted data extracted by the transmitted-data extract structure.

In another aspect, the invention features a method of controlling an interface module which interface module is inserted into the interface board slot of a printer. The method comprises the steps of receiving the data received by a host computer, extracting journal print data from the data received thereby, storing the extracted journal print data at step in a nonvolatile memory circuit, extracting data to be transmitted to the printer from the data received thereby, and transmitting the received data extracted at step to the printer.

In another aspect, in an interface module having a nonvolatile memory circuit according to the present invention, an information record medium for storing programs for controlling the interface module which is inserted into the interface board slot of a printer is operated through the steps of receiving the data received by a host computer, extracting journal print data from the data received thereby, storing the extracted journal print data in the nonvolatile memory circuit, extracting data to be transmitted to the printer from the data received thereby, and transmitting the extracted transmitted data to the printer.

In another aspect, the invention features an interface board which is inserted into the interface board slot of a printer and includes a receiver for receiving the data transmitted from the host computer as received data via a host-computer interface, a journal-data-extract unit for extracting journal print data from the data received by the receiver, a nonvolatile memory circuit for storing the journal print data extracted by the journal-data-extract unit, a transmitted-data extract unit for extracting data to be transmitted to the printer from the data received by the receiver, and a transmitter for transmitting the transmitted data extracted by the transmitted-data extract unit to the printer via a printer interface.

In yet another aspect, the invention features a method of controlling the interface board according to the present invention as the method of controlling the interface board inserted into the interface board slot of the printer and used for receiving commands exchanged between the host computer and the printer. The method comprises the steps of receiving the first data from the host computer, deciding the kind of the first data received therefrom, and on finding the kind of the first data received therefrom to be journal print data, storing the journal print data in the nonvolatile memory circuit on the interface board when the first received data is journal print data.

In still yet another aspect, the invention features a method of controlling the interface board as the method of controlling the interface board inserted into the interface board slot of the printer and used for receiving commands exchanged between the host computer and the printer. The method comprises the steps of receiving the data transmitted from the host computer as received data, deciding the kind of the data received therefrom, and on finding the kind of the data received therefrom to be journal print data, storing the journal print data in the nonvolatile memory circuit on the interface board when the received data is the journal print data.

In another aspect, the invention features a method of controlling the interface board according to the present invention as the method of controlling the interface board inserted into the interface board slot of the printer and used for receiving commands exchanged between the host computer and the printer. The method comprises the steps of receiving the data transmitted from the host computer as received data, deciding the kind of the data received therefrom, on finding the kind of the data received therefrom to be journal print data, storing the journal print data in the nonvolatile memory circuit on the interface board when the received data is journal print data on finding the kind of data received therefrom to be data other than the journal print data, transmitting the data to the printer.

In another aspect, the invention features an interface module according to the present invention which is connected between the host computer and the printer and inserted into the interface board slot of the printer. The interface module includes structure for receiving data from the host computer and removing received data which the printer is unable to cope with out of the data received therefrom.

Further, programs for controlling the interface module according to the present invention can be stored in an information record medium such as a compact disk, a floppy disk, a hard disk, a magneto-optic disk, a digital video disk, a magnetic tape or the like.

The invention features one or more of the following advantages.

An interface module can be provided wherein an interface module which is fitted in the expanded slot of a printer and connected to a host computer. The interface module is used for extracting journal print data from the data received from the host computer in order to store the extracted data in a nonvolatile memory circuit and for extracting data other than the journal print data for a record medium. The extracted data is transmitted to the printer in order to make the printer print a receipt, for example. A method of controlling the interface module is also provided.

When accounting application software for use in separately printing a journal and a receipt (e.g., with a two-sheet printer) is operated, journal print data can be stored as an electronic journal only by inserting the interface board according to the present invention into the interface board slot of the printer without changing the printer. Therefore, cost reduction is made achievable by utilizing a printer (a so-called one station receipt printer) having only one printhead.

Since the printer is used to print data out of the journal print data by transmitting the journal print data stored in the nonvolatile memory circuit, it is possible to provide an interface module capable of printing the same print image as the initial print image prepared by the host computer on a print medium and a method of controlling the interface module.

As journal print data is also printable using a printer for printing receipts, cost reduction becomes feasible without using an expensive two-sheet printer.

An interface module capable of effectively utilizing the storage capacity of the nonvolatile memory circuit can be provided because the contents of the nonvolatile memory circuit can be deleted after print data out of the journal print data is printed together with the method of controlling the interface module.

When the printer fitted with the interface module according to the present invention is used as a printer in accounting, the contents of the nonvolatile memory circuit can be deleted provided the journal print data is printed at predetermined time intervals in settling accounts of stores.

Cost reduction is achievable because it is possible to communicate with a printer by making use of inexpensive all-purpose connectors.

The interface module can be mounted in the case of the printer to save the office space and to improve the appearance of the office.

Information record media with programs recorded therein can easily be distributed and sold as software products independent of interface modules. When the program recorded in the information record medium according to the present invention is read out of ROM of the interface module and executed, it is possible to utilize the interface module and control the interface module according to the present invention.

Since an electronic journal (journal print data) is stored in the flash memory on the interface board, the electronic journal can easily be printed according to the command received from the host computer even though the interface board is replaced. The interface module may alternatively be inserted into any other printer. The interface module is portable and set free from being damaged during transportation because it is equipped with flash memory.

The electronic journal can be preserved as long as any existing printer is loadable with the interface board, so that such an existing printer is utilizable. Moreover, saving of paper resources as well as not having to use carbon copy paper has the effect of improving environmental protection.

The present invention is advantageous in that the flash memory is so arranged as to prevent a serial number (ID) inherent in an interface board from being deleted to ensure its security. The host computer puts the serial number of the interface board under control, for example, and this ensures that its security is enhanced because unless the serial number of a specific interface board is identified after the interface board is replaced, read/write of an electronic journal on the unidentified interface board is prevented.

Even when the host computer is without a print driver corresponding to the printer, various kinds of printers can be dealt with by emulating the printer driver on the interface board.

DETAILED DESCRIPTION

An embodiment of the present invention will now be described. An embodiment of the invention to be described below is intended for the purpose of explanation only and will never limit the scope thereof. Therefore, any person skilled in the art may employ any mode for carrying out the invention by substituting any one of the elements or the whole element therein with equivalents; however, any mode therefor is needless to say within the scope of the invention.

Terms of a control command will be defined as follows:

Any data transmitted from a host computer (a host machine) to an interface board (i.e., any data that the interface board receives from the host computer (the host machine)) shall be received data.

The received data is classified into two parts: print data and a control command. The print data shall be the data itself printed on a print medium such as journal paper and receipt paper. The control command shall be received data other than what is printed on the print medium.

The control command includes a journal select command to select journal paper as a print medium, a receipt select command to select receipt paper other than the journal paper as a print medium, for example, a board control command to control the interface board, and other commands.

The board control command includes, for example, a delete command to delete the journal data stored on the interface board, a print command to transmit the journal data stored on the interface board to a printer so as to print the journal data, a transmit command to transmit the journal data stored on the interface board to the host computer, and any other special command.

Other commands included in the control command further include a print format select command and a font select command.

Journal print data out of the print data, the journal select command, a journal print format select command and a journal font select command out of other commands shall be stored in a nonvolatile memory circuit as journal print data.

Receipt print data out of the print data, the receipt select command, a receipt print format select command and a receipt font select command out of other commands shall not be stored in the nonvolatile memory circuit but shall be sent to and printed by the printer.

Print data to be actually printed on receipt paper out of the receipt print data transmitted from the interface board to the printer shall be receipt print data.

When the journal print data stored in the nonvolatile memory circuit on the interface board is transmitted by the host computer to the printer, further, the transmitted data shall be the same as the journal print data, whereas print data to be actually printed on journal paper shall be journal print data.

Figure 1:
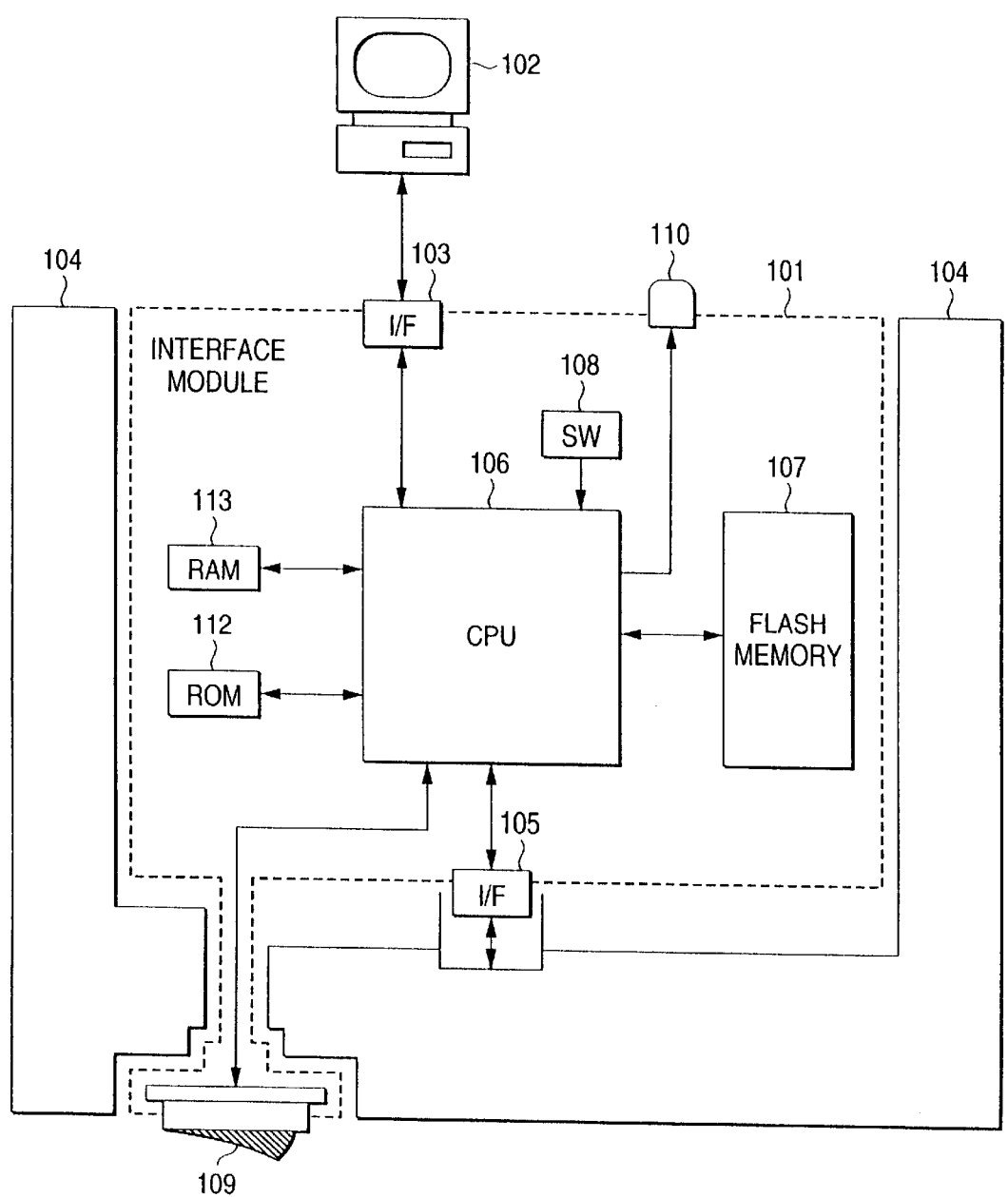
FIG. 1 is a block diagram giving an outline of an embodiment of an exemplary interface module.

In FIG. 1, an interface module 101 is connected to a host computer 102 via a host-computer interface (I/F) 103 and receives the print command transmitted from the host computer 102.

A personal computer is fit for use as the host computer 102 loaded with an operating system such as Windows, JAVA or the like.

A printer 104 which operates according to a control command such as ESC/POS is suitable.

The interface module 101 is an interface board which is inserted into the interface board slot of the printer 104.

A host-computer interface 103 and a printer interface 105 that can be employed are those adapted for serial transfer conforming to the RS-232C standard, parallel transfer conforming to the Centronics standard, General Purpose Interface Bus (GPIB), VMExtensions for Instrumentation (VXI), network connection such as Ethernet 10 Base-T and new data transfer standard like Universal Serial Bus (USB).

When TTL (Transistor-Transistor Logic) circuits in the host computer 102 and the printer 104 are operated at a drive voltage level different from the drive voltage level applied to any internal circuit of the interface module 101, it is possible to readily change the signal level by providing a driver circuit for making level conversion for the host-computer interface 103 and the printer interface 105. In printers that have already come into wide use, a connector conforming in form to the RS-232C standard is often used in a portion to which the printer interface 105 is connected. This RS-232C standard is different from the signal level of TTL (5V). Consequently, the internal circuit of the interface module 101 can readily be connected to the printer only by adding an inexpensive driver circuit to the interface module 101 and this makes cost reduction achievable. Since the connector form based on the existing standard, not a new connector form, can be employed, cost reduction becomes also feasible.

In FIG. 1, Central Processing Unit (CPU) 106 checks the data received from the host computer 102 via the host-computer interface 103, and selects and extracts journal print data from the received data. Then the CPU 106 stores the extracted journal print data in a nonvolatile memory circuit (a nonvolatile storage unit) 107 formed of EEPROM (Electrically Erasable Programmable Read Only Memory) or flash memory. The data stored in the nonvolatile memory circuit 107 is an "electronic journal".

NAND-type flash memory in addition to the flash memory, EEPROM or the like is utilizable as the nonvolatile memory circuit. The following description refers to a case where the flash memory is used.

The CPU 106 extracts receipt print data, for example, as a print command other than journal information and transmits the extracted receipt print data to the printer 104 via the printer interface 105.

In an embodiment, the interface module 101 is to be furnished with a DIP switch 108. In this case, the CPU 106 checks whether the DIP switch 108 has been set when the power supply is put to work, for example. In response to the setting of the DIP switch 108, the CPU 106 selectively follows the process steps of:

(1) setting communicating conditions concerning communicating data length in the host-computer interface 103 and the printer interface 105, the presence or absence of parity check, transfer speed and the like;

(2) clearing (deleting) the contents of the flash memory 107, transmitting a message to the effect that the contents thereof have been "deleted" to the printer 104 via the printer interface 105 and operating the printer;

(3) transmitting a message to the host computer 102 via the host-computer interface 103 to the effect that the journal information stored in the flash memory 107 has been deleted for some reason or other and giving the host computer a warning; and (4) inspecting the internal state of the interface module 101. The CPU 106 further follows the process steps of, for example:

(a) clearing the whole information excluding information concerning a serial number inherent in the interface board that has been stored in the flash memory 107 and must not be deleted, for example, and putting a mark in a bad block, if any, to show that the address should not be used;

(b) making the printer 104 print the version and checksum of a program to be executed by the CPU 106 of the interface module 101, the program being stored in ROM (Read Only Memory) 112;

(c) making the printer 104 print information concerning the number of bad blocks, the manufacture and device codes of the flash memory 107; and (d) making the printer 104 print the contents stored in Random Access Memory (RAM) 113 for use as a temporary storage unit for the CPU 106 and a storage unit for buffering the data received by the host-computer interface 103 and the data transmitted by the printer interface 105.

In an embodiment, a part or the whole of the DIP switch 108 may be formed, but is not limited to be formed, of a jumper switch.

Moreover, a function equivalent to the function of switching (setting) the DIP switch 108 may be fulfilled according to a special command out of the control command transmitted from the host computer 102 without using the DIP switch 108. For example, clearing the information stored in the flash memory 107 and processing the bad block with a mark can also be carried out according to the command of the host computer 102. In addition, as shown at Step S506 of FIG. 5, the electronic journal stored in the flash memory 107 may be transmitted to the external unit of the host computer 102 or the like via the host-computer interface according to the transmit command of the host computer 102.

The printer 104 may be used to print the journal print data stored in the flash memory 107 by operating a journal print switch 109.

When the CPU 106 detects that the journal print switch 109 is turned on in a specific situation in which the print data has not transmitted from the host computer 102, the CPU 106 sequentially retrieves the journal print data stored in the flash memory 107 and transmits the journal print data to the printer 104 via the printer interface 105.

As data for driving the printer 104 such as a print format select command and the like in addition to the print data is included in the journal print data stored in the flash memory 107, the print image anticipated by the software of the host computer 102 can be printed on journal paper.

In an embodiment, the journal print switch 109 may be fulfilled according to the command transmitted from the host computer 102 without using the journal print switch 109. In other words, the printer 104 may be used to print the journal information stored in the flash memory 107 according to the command of the host computer 102.

An operation display lamp 110 is turned on when power is supplied to the interface module 101 and when the interface module is properly operating. The communicating conditions of the host-computer interface 103 and the printer interface 105, and the processing condition of the CPU 106 can also be displayed by changing colors, blinking or the like.

The host-computer interface 103, together with the CPU 106, functions as a transmit unit.

Further, the printer interface 105, together with the CPU 106, functions as a transmitter.

The CPU 106 functions as a journal-information extract unit, a transmit-print-command extract unit, a journal-information-transmit control unit, a journal-information delete unit, and a journal-information-transmit-command extract unit.

The flash memory (or EEPROM) 107 functions as nonvolatile storage.

The journal print switch 109 functions as a journal-information-print-command-input receive unit.

The ROM 112 functions as an information record medium for storing programs to be executed by the CPU 106. Further, the Basic Input Output System (BIOS) program stored in the ROM 112 may be in such a form that it can be updated by the host computer 102 without ROM 112. In this case, rewritable nonvolatile memory, in place of the ROM 112 is used. The BIOS program is loaded with the BIOS program from an information record medium in the host computer 102 such as a floppy disk, CD-ROM, a magneto-optic disk, a hard disk, a digital video disk, a magnetic tape or the like.

The use of the interface module 101 allows the direct use of accounting application software for a two-sheet printer (a receipt and journal printer) in the host computer 102.

An existing one-sheet (receipt) printer having an interface board is utilizable as the printer 104 and this makes it unnecessary to utilize a conventional expensive two-sheet printer having two heads.

Further, a receipt and a journal can simultaneously be printed with the inexpensive one-sheet printer by utilizing a double sheet of paper (carbon copy paper) as before. In this case, however, such accounting software to print the receipt and the journal with different formats is unutilizable in the host computer 102. In an embodiment, accounting software allowing a receipt and a journal to be printed with different print formats is utilizable in the host computer 102 because the CPU 106 has the journal print data including the print format stored separately from the receipt print data.

Although the CPU 106 extracts "a print command other than the print command of printing a journal" (e.g., a receipt print data) as the received data transmitted from the host computer to the printer 104 without storing the print command in the flash memory 107, any extract technique other than the aforementioned may be employed. In the case of a printer incapable of having slip paper printed, for example, use can be made of an extract technique of extracting and deleting received data (slip print data in this case) for carrying out slip printing that the printer 104 is unable to deal with and storing the received data in the flash memory 107 separately from the journal print data.

When the host computer 102 transmits an interface board control command to set the interior of the interface module 101, the CPU 106 extracts this command and processes the command within the interface module 101 but does not transmit the command to the printer 104.

Although the host-computer interface 103, the printer interface 105, the flash memory 107, the DIP switch 108, the journal print switch 109, the operation display lamp 110, the ROM 112 and the RAM 113 are arranged so that they may be connected to the CPU 106 individually according to this embodiment, they can also be connected thereto with a bus.

Figure 2:
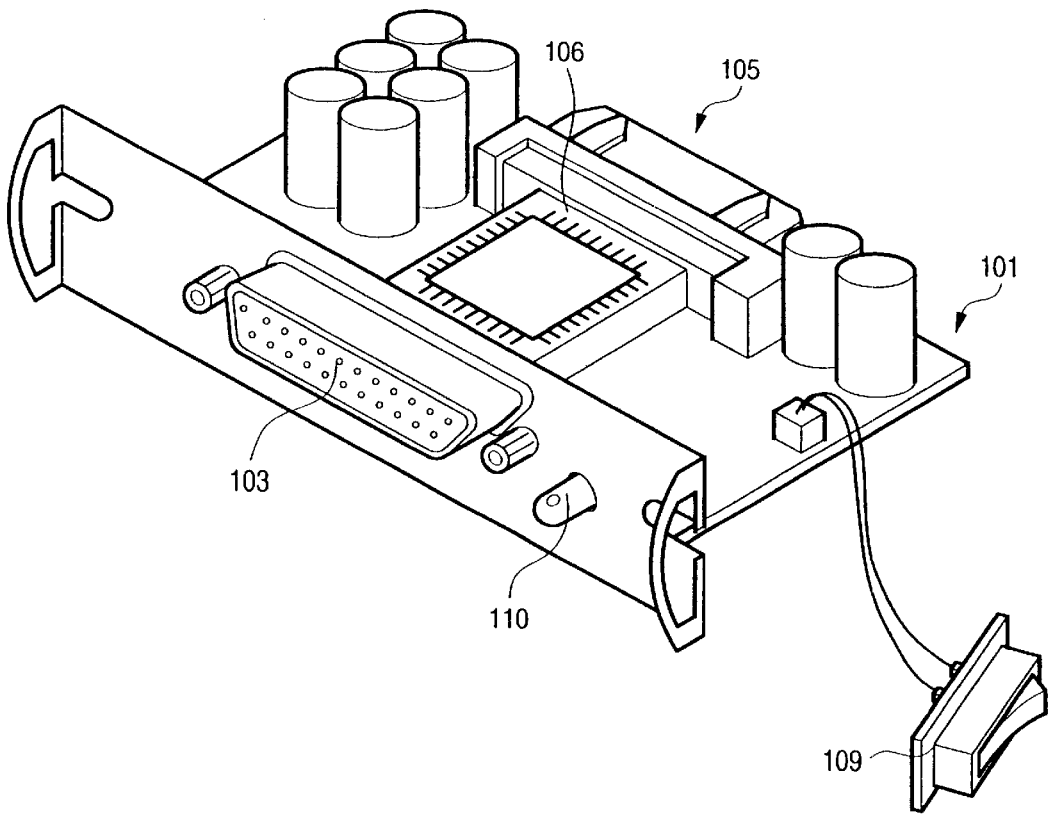
FIG. 2 is a schematic illustration of an embodiment of the interface module.

FIG. 2 illustrates an embodiment of the interface module. The host-computer interface 103 and the operation display lamp 110 of the interface module 101 are disposed on the back of the interface module 101. The interface module 101 is designed to size so that it is just fitted in the interface board slot. The interface module thus designed to shape is called an "an interface module for a printer."

Since the interface module 101 has been designed to size as mentioned above, it appears that the host-computer interface 103 and the operation display lamp 110 are disposed on the back of the printer 104 itself when the interface module 101 is fitted to the printer 104. Since the interface module 101 is inserted into the printer 104 from the back side of the printer 104, moreover, this arrangement is of use for saving the equipment disposing space and preventing the interface module 101 from being inadvertently contacted and struck. In addition, that arrangement is helpful in improving office appearance.

The DIP switch 108 (not shown) provided on the circuit board and the journal print switch 109 which is absent thereon may be disposed on the back side of the printer 104. If there is room for mounting a switch on the front panel of the printer 104, operability can be improved by locating the journal print switch 109 on the front panel of the printer 104.

Processing received data in the interface module according to the present invention will now be described with reference to FIG. 3, which is a flowchart showing the steps of processing the received data in the interface module.

First, the CPU 106 waits for the arrival of data to be received from the host computer 102 in Step S301. The data received from the host computer 102 is received by the CPU 106 via the host-computer interface 103 before being temporarily stored in the RAM 113.

Transfer of the data from the host-computer interface 103 to the RAM 113 is made by Direct Memory Access (DMA) and any step at and after Step S302 may be followed upon the termination of the transfer.

Then the CPU 106 analyzes the received data and decides whether the received data is journal print data or not (receipt print data) in Step S302.

A detailed description of the processing at Step S302 will be given now with reference to FIG. 6. On receiving data from the host computer 102 at Step S601 (corresponding to S301 of FIG. 3), the CPU 106 analyzes the received data byte by byte and decides whether the data is a journal select command. When the data has been decided to represent the journal select command (S602; YES), the journal register flag of the CPU 106 is set (Step S603). Then the journal select command is stored in the flash memory 107 (Step S604; corresponding to Step S303 of FIG. 3).

If the received data is not the journal select command (Step S602; NO), Step S605 is followed wherein the CPU 106 decides that the received data is not the journal select command (e.g., a receipt select command).

If the received data is not a command other than the journal select command at Step S605 (S605; NO), the received data may be print data, a board control command or any other command. The CPU 106 then decides whether the received data is the board control command at Step S606 and if the board control command is decided to be applicable (Step S606; YES), the CPU 106 executes the control command in step S610 and returns to the initial step. If the received data is not the board control command at Step S606 (S606; NO), Step S607 is followed at which the CPU 106 decides whether the journal register flag has been set. When the journal register flag has already been set at step S607 (S607; YES), the received data is stored in the flash memory 107 at Step S604 because the received data is print data to be printed on journal paper, or a print format or a print font when the journal paper is printed. When the journal register flag has not been set at Step S607 (S607; NO), the received data is forwarded, in Step S609 (corresponding to S304 of FIG. 3), to the printer for printing receipt paper because the received data is print data for receipt (other than journal) paper, or a print format or a print font when the receipt paper is printed.

When the received data is decided to represent the receipt (other than journal) select command at Step S605 (S605; YES), on the other hand, Step S608 is followed at which the journal register flag is reset and Step S609 is followed to transmit the receipt select command to the printer.

When the board control command is applicable (as discussed below, for example, with respect to Steps S504–S507 of FIG. 5) at Step S606, the CPU 106 performs the board control step at S610 and returns to ③.

Figure 6:
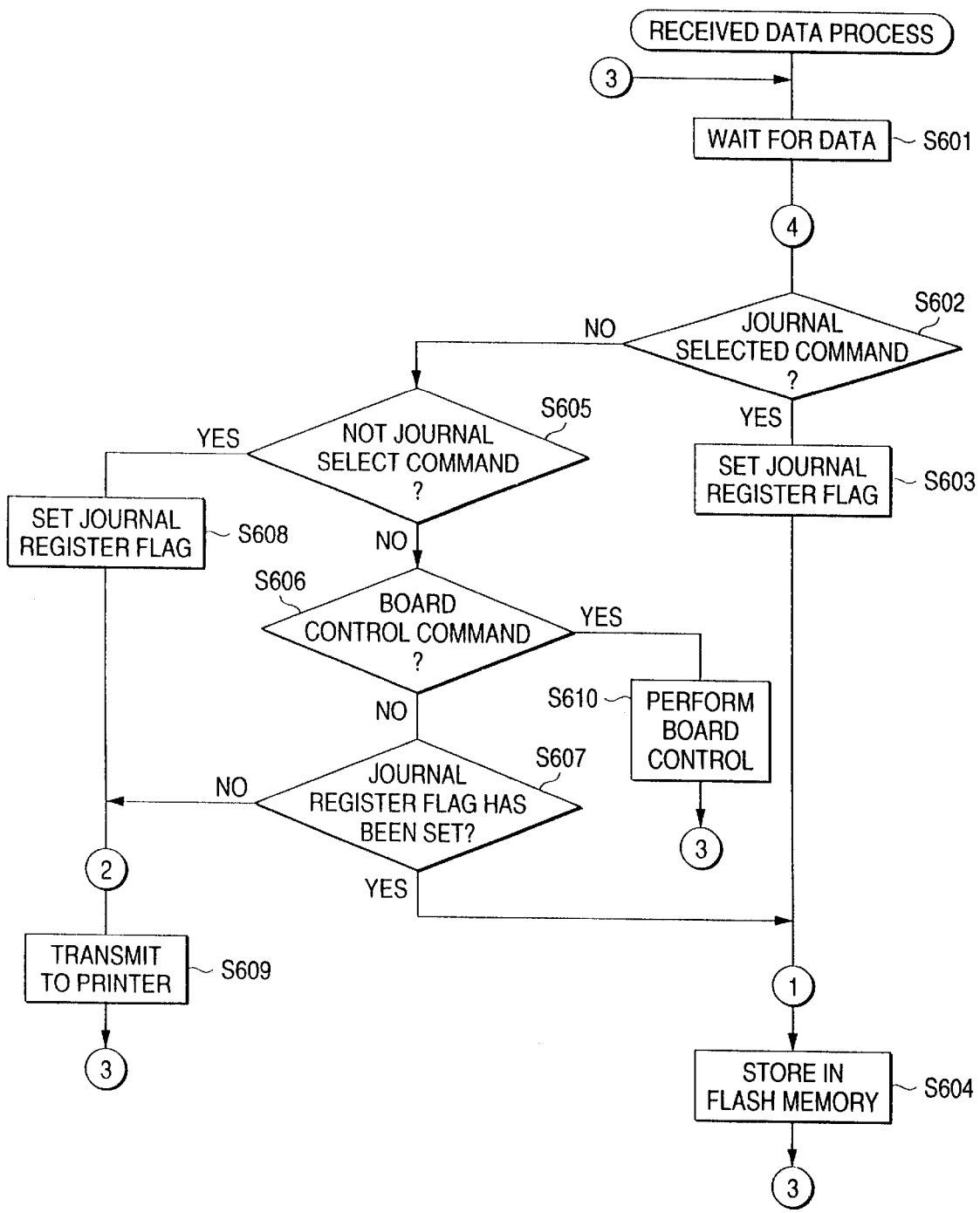
FIG. 6 is a detailed flowchart at the time of deciding whether or not the received data processed in FIG. 3 is journal print data.

Steps ranging from ④ to ① in FIG. 6, excluding the board control, correspond to (Step S302; YES) in FIG. 3 at which the CPU 106 decides that the received data is the journal print data.

Further, steps ranging from ④ to ② in FIG. 6 correspond to (Step S302; NO) in FIG. 3 at which the CPU 106 decides that the received data is not the journal print data.

At Step S602 of FIG. 6, the received data, which may be based on hexadecimal notation, may be employed at the time of deciding whether the received data is the journal select command.

For example, the following designate journal select commands meaning "the data received after receipt of this command is journal print data." (h means hexa of the hexadecimal notation):

1Bh, 63h, 30h, 01h.

On receiving the journal select command (Step S602; YES), the CPU 106 sets the journal register flag as mentioned above (Step S603).

When it is decided that the receipt select command is applicable at Step S605 of FIG. 6, moreover, the received data based on hexadecimal notation may be employed at the time of deciding whether the received data is the receipt select command as in the case of a receipt select command.

For example, the following designate receipt select commands meaning "the data received after receipt of this command is receipt print data."

1Bh, 63h, 30h, 02h.

On receiving the receipt select command (Step S605; YES), the CPU 106 resets the journal register flag (Step S608).

Since the CPU 106 sets the journal register flag once the journal select command is received, the journal select command is not reset until the next command, such as the receipt select command, other than the journal select command is received and the CPU 106 stores any received data other than the board control command in the flash memory 107 as the journal print data.

In addition to the method of deciding the set condition of the journal register flag within the CPU 106, the CPU 106 is able to perform similar processing with a specific area of RAM 113 as a journal flag bit by referring to the condition of the journal flag bit.

In an embodiment, a bit in the data received from the host computer 102 may be used for selecting printing paper. This embodiment of the invention is applicable to a case where the communicating speed of the print command including the print data is relatively high. In the case where print data allowing at least four kinds of printing paper to be designated with two bits from the 15th up to the 16th bit is adopted when each print command is constituted of 16 bits, it is possible to distinguish between journal print data and what is intended for any other kind of printing paper (receipt, slip, ticket or the like) by referring to the contents of the 15th and 16th bits.

Referring again to FIG. 3, the CPU 106 stores the journal print data (the journal select command, the print data printed on journal paper, the print format and print font at the time the journal paper is selected and the like) in the flash memory 107 (Step S303) when the journal print data is applicable (Step S302; YES) and returns to Step S301. Thus, a journal-printed electronic copy is stored in the nonvolatile storage means as the electronic journal.

When the receipt print data (Step S302; NO) is other than the board control command, for example, the CPU 106 transmits the relevant data (e.g., the receipt print data: the receipt select command, the print data printed on receipt paper, the print format and print font at the time the receipt paper is selected and the like) (Step S304) and returns to Step S301.

The interface module is operated as a filter between the host computer and the printer by carrying out these process steps. The data received from the host computer is filtered by this filter, so that the journal print data is removed.

Printing journal information in the interface module according to the present invention will now be described with reference to FIG. 4(a), wherein the journal print data removed through the above filter process and stored in the nonvolatile storage unit is actually printed.

The journal information print process is started by operating the journal print switch 109 but it may be started according to a command from the host computer 102 as will be described hereinafter.

First, the CPU 106 checks whether received data journal print data) has been stored in the flash memory 107 (Step S401).

When the journal print data has not been stored therein (Step S401; NO), this process is terminated.

When the journal print data has been stored therein, on the other hand, the CPU 106 retrieves the journal print data up to a predetermined unit (e.g., equivalent to one block as a unit of deleting the flash memory 107) (Step S402).

The journal print data thus retrieved is temporarily stored in the RAM 113 before being subjected to buffering.

Then the printer interface 105 transmits to the printer the journal print data temporarily stored in the RAM 113 and retrieved therefrom up to the predetermined unit (Step S403). Through this process step, the printer 104 prints data to be printed on journal paper out of the journal print data.

Further, the CPU 106 checks whether or not journal printing is successful (Step S404). In a case where an error message is sent from the printer 104 so as to inform, for example, that an error in the printing operation has been detected (Step S404; NO), the CPU 106 performs the operation of processing the error (Step S405). In order to deal with the error at Step S405, the CPU 106 may return to Step S403 to try transmitting the data to the printer, giving a warning to the operation display lamp 110, transmitting an error status to the host computer 102 or terminating the process concerned.

When the printing operation is successful (Step S404; YES), the CPU 106 deletes the journal print data from the flash memory 107 (Step S406) and returns to Step S401.

In this case, the CPU 106 may refrain from executing Step S406 or may terminate the flow herein without deleting the relevant journal print data. It is desirable for the CPU 106 to inform the host computer 102 to that extent when space capacity is decreasing and to delete the contents of the flash memory 107 by operating the DIP switch 108 and the like after printing data to be printed on necessary journal paper journal print data) so that the electronic journal may be stored again.

Since deleting the flash memory 107 takes time, the RAM 113 is stored with one of the blocks to be deleted at Step S406 so that these blocks may be deleted collectively before the process is terminated (after Step S401; NO).

In FIG. 4(b), the CPU 106 decides whether unprocessed journal print data is stored in the flash memory at Step S4001 and if the unprocessed journal print data is stored therein (i.e., if journal print data to be printed; Step S4001; YES), the CPU 106 transmits the unprocessed journal print data to the printer (S4002, S4003). Further, the CPU 106 decides whether the printing operation is successful and if it is successful (Step S4004; YES), the CPU 106 registers a block to be deleted within the flash memory (S4006) and returns to S4001.

When the unprocessed journal print data is not stored in the flash memory at Step S4001 of FIG. 4(b) (i.e., when journal print data to be printed has been printed completely; S4001; NO), the registered block is deleted at Step S4006 and the relevant journal print data stored in the flash memory is deleted (S4007).

In this case, the processing of received data (FIG. 3) and that of journal information printing (FIGS. 4(a), (b)) may be defined as co-routines.

For example, the journal print switch 109 is operated so that interruption may occur. When the interruption processing routine is entered, the CPU 106 checks how many seconds have passed after the stage of waiting for the received data is entered on condition that the predetermined number of seconds have passed, and the process of printing journal information (FIG. 4) is followed. Upon the termination of this process, the CPU 106 returns to Step S301 at which the interruption and the like occur.

Moreover, the data reception may be controlled by interruption. In this case, received data processing (FIG. 3) is subdivided and each of the process steps is defined as a co-routine. When the interface module 101 receives data from the host computer 102 and when data to be transmitted to the printer 104 is accumulated in the RAM 113 as predetermined, processing the data received from the host computer 102 as well as processing the data transmitted to the printer 104 is transmitted to the aforementioned co-routine.

The journal print data is stored in the nonvolatile memory circuit such as the flash memory and EEPROM. In the nonvolatile memory circuit, the information stored therein is never erased even if power is not supplied. A NAND-type flash memory is employed in this embodiment of the invention.

The flash memory 107 stores journal print data in a format similar to that of a text file. Therefore, alphanumeric characters are stored in the form of ASCII codes and each of codes representing carriage return (CR) and line feed (LF) is stored at the end of each line. These character codes function as print data if transmitted to the printer, whereupon a character corresponding to the relevant character code, so that the carriage return of the printhead and the line feed are executed.

The capacity of the flash memory 107 is 2 MB. When a journal is actually printed on paper, each line has a width of 30 characters with 8 line per inch, roll paper being 1,400 inch. Consequently, the flash memory 107 is capable of storing journal information equivalent to about 6 rolls.

(Interface Board Control Command)

The board control command for controlling the interface board will now be described. The board control command includes the following:

A delete command for deleting the journal print data stored in the flash memory 107:

1Ch, 6Ah, 30h, 00h;

A print command for transmitting the journal print data stored in the flash memory 107 to the printer and having the data printed:

1Ch, 6Ah, 30h, 04h; and

A transmit command for transmitting the journal print data stored in the flash memory 107 to the host computer 102:

1Ch, 6Ah, 30h, 0Ch.

Figure 3:
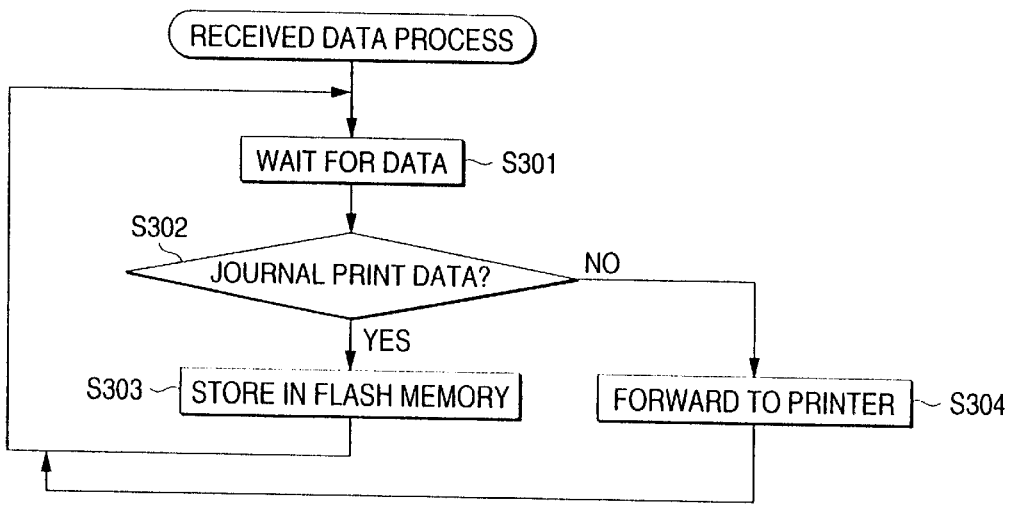
FIG. 3 is a flowchart for processing the data received by the interface module in an embodiment.

When the board control command is received, the flowchart of FIG. 6 including Step S606 is not used but a technique of increasing branches from Step S302 of the flowchart shown in FIG. 3 may be employed. FIG. 5 is a flowchart showing the outline of processing the data received by the interface module.

Figure 5:
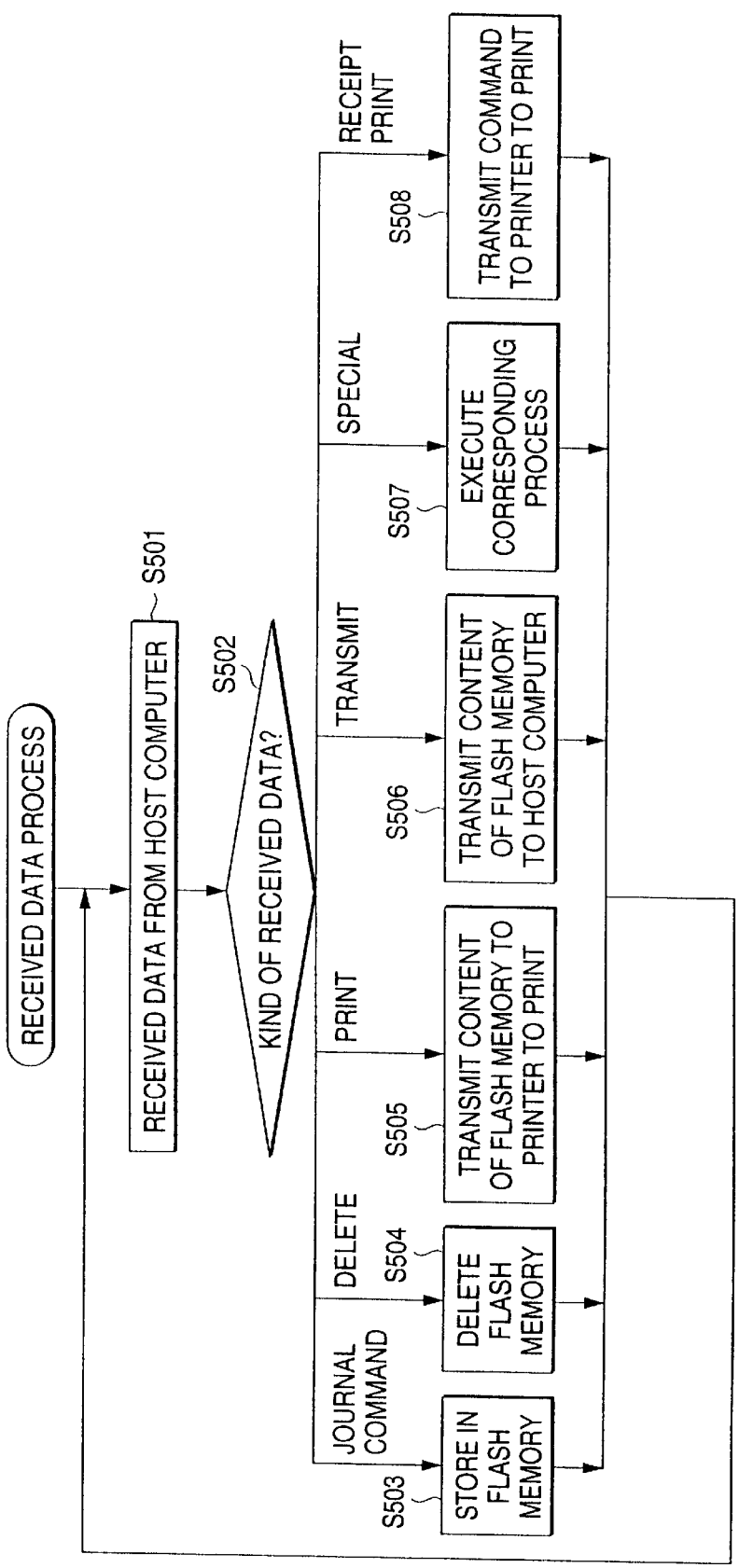
FIG. 5 is a flowchart for processing the data received by the interface module of an alternative embodiment.

As shown in FIG. 5, the CPU 106 receives data from the host computer 102 (Step S501) and checks the kind of received data (Step S502).

If the received data is journal print data (Step S502; journal command), the CPU 106 has the relevant journal print data stored in the flash memory 107 (Step S503) and returns to Step S501.

If the received data is a delete command (1Ch, 6Ah, 30h, 00h) for deleting the journal print data stored in the flash memory 107 (Step S502; delete), the CPU 106 deletes the journal print data stored in the flash memory 107 (Step S504) and returns to Step S501.

If the received data is a print command (1Ch, 6Ah, 30h, 04h) for making the printer print the journal print data stored in the flash memory 107 (Step S502; print), the CPU 106 transmits the journal print data stored in the flash memory 107 to the printer to have the data printed (Step S505) and returns Step S501.

Figure 4:
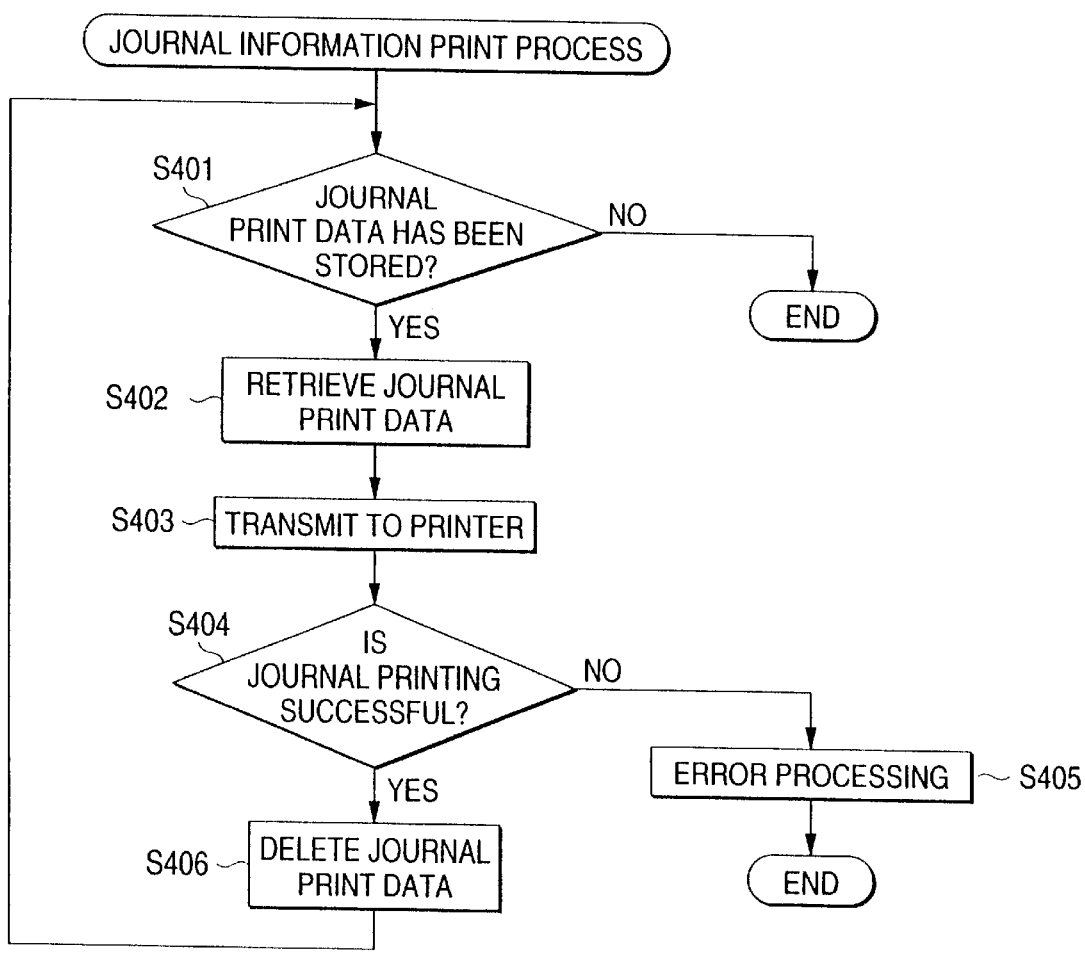
FIGS. 4a and 4b are flowcharts for processing printing journal information in the interface module in an embodiment.
Figure 4:
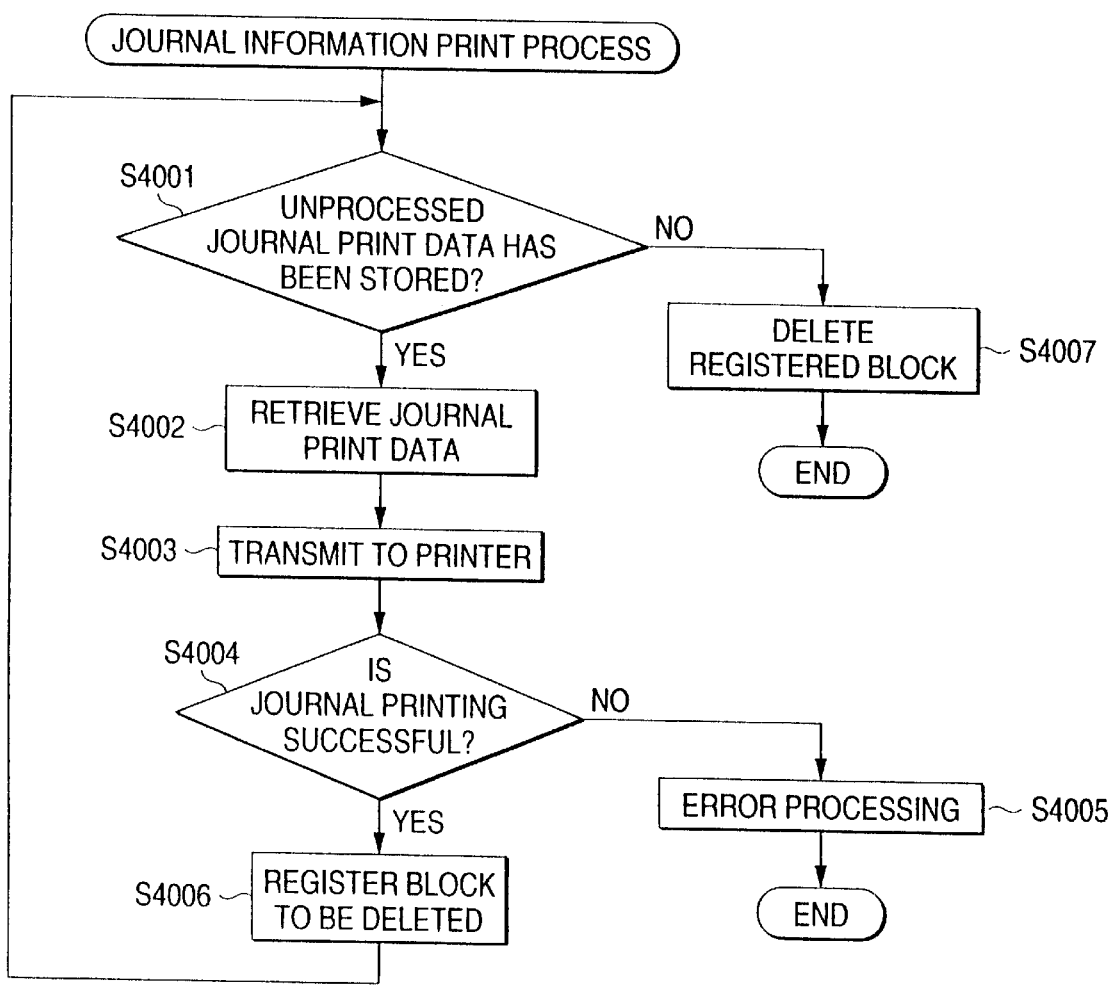

In the process of printing the journal information shown in FIG. 4(*a*), though the CPU 106 deletes the journal print data stored thus stored therein from the flash memory 107 (Step S406), this process is unnecessary at Step S505, and an equivalent function can be achieved through the process at Step S504.

If the received data is a transmit command (1Ch, 6Ah, 30h, 0Ch) for transmitting the journal print data stored in the flash memory 107 to the host computer (Step S502; transmit), the CPU 106 transmits the journal print data stored in the flash memory 107 to the host computer 102 via the host-computer interface 103 (Step S506) and returns to Step S501.

If the received data is a special command (e.g., a command to cancel an immediately prior command) relative to the interface module 101 (Step S502; special), the CPU 106 executes the corresponding process (Step S507) and returns to Step S501.

If the received data is any other data than those mentioned above, namely, receipt print data for printing a typical receipt to be given to a customer (Step S502; receipt print), the CPU 106 transmits the relevant data to the printer via the printer interface 105 (Step S508) and returns to Step S501.

As the journal print data stored in the flash memory 107 and transmitted to the printer 104 in Step S403 (FIG. 4(*a*)) and Step S505 (FIG. 5), there are other commands including a command to determine the print format intended for journal paper in addition to print data to be printed on journal paper as follows: print mode select (e.g., super fine mode or draft mode); designation of print position; designation of print image (the following data is not text data but image data); designation mode of under line/emphasize/ double striking; designation of character code/character set (king of font) for use; and bar-code printing. These specifications may be properly changed in agreement with the mode of use. Other commands are used to have receipt paper printed.

What is claimed is:

1. An interface module which is inserted into an interface board slot of a printer, comprising:

receive means for receiving data from a host computer, the data including journal print data and receipt print data;

journal-data extract means for extracting journal print data from the data received by the receive means;

a nonvolatile memory circuit for storing the journal print data extracted by the journal-data extract means;

transmitted-data extract means for extracting data to be transmitted to the printer from the data received by the receive means;

transmit means for transmitting to the printer the transmitted data extracted by the transmitted-data extract means;

journal-data-transmit-command extract means for extracting a command to transmit the journal print data stored in the nonvolatile memory circuit from the data received by the receive means to the host computer; and transmit means for transmitting the journal print data stored in the nonvolatile memory circuit to the host computer when the transmit command is extracted by the journal-data-transmit-command extract means.

2. An interface module as claimed in claim 1 wherein the transmit means is a connector conforming to the RS-232C standard.

3. An interface module as claimed in claim 1, further comprising:

input accepting means for accepting a command input for transmitting the journal print data stored in the nonvolatile memory circuit to the printer; and journal-information-transmit control means for transmitting the journal print data stored in the nonvolatile memory circuit to the printer via the transmit means when the command input is accepted by the input accept means.

4. An interface module as claimed in claim 1, further comprising journal-information delete means for deleting the journal print data from the nonvolatile memory circuit when the journal print data stored in the nonvolatile memory circuit is transmitted to the printer.

5. A method of controlling an interface module which is inserted into an interface board slot of a printer and fitted with a nonvolatile memory circuit, comprising the steps of:

receiving data from a host computer, the data including journal print data and receipt print data;

extracting journal print data from the data received thereby;

storing the extracted journal print data in the nonvolatile memory circuit;

extracting data to be transmitted to the printer from the data received thereby;

transmitting the extracted received data to the printer;

extracting from the received data a transmit command to transmit the journal print data stored in the nonvolatile memory circuit to the host computer; and when the transmit command is extracted, transmitting to the host computer the journal print data stored in the nonvolatile memory circuit.

6. A method as claimed in claim 5, further comprising:

deciding whether a command to print the journal print data stored in the nonvolatile memory circuit is inputted; and if the command input is decided to mean an accepted one, transmitting to the printer the journal print data stored in the nonvolatile memory circuit.

7. A method as claimed in claim 5, further comprising, when the journal print data stored in the nonvolatile memory circuit is transmitted to the printer, deleting the transmitted data from the nonvolatile memory circuit.

8. In an interface module having a nonvolatile memory circuit, an information record medium for storing programs for controlling the interface module which is inserted into an interface board slot of a printer, is operated through the steps of:

receiving the data received by a host computer, the data including journal print data and receipt print data;

extracting journal print data from the data received thereby;

storing the extracted journal print data in the nonvolatile memory circuit;

extracting data to be transmitted to a printer from the data received thereby;

transmitting the extracted transmitted data to the printer;

extracting from the received data a transmit command to transmit the journal print data stored in the nonvolatile memory circuit to the host computer; and when the transmit command is extracted, transmitting to the host computer the journal print data stored in the nonvolatile memory circuit.

9. An interface module as claimed in claim 8, being further operated through the steps of:

deciding whether a command input for printing the journal print data stored in the nonvolatile memory circuit has been accepted; and when the command input is decided to be an accepted one, transmitting to the printer the journal print data stored in the nonvolatile memory circuit.

10. An interface module as claimed in claim 8, being further operated through the step of when the journal print data stored in the nonvolatile memory circuit is transmitted to the printer, deleting the data from the nonvolatile memory circuit.

11. An interface board which is inserted into an interface board slot of a printer, comprising:

a receiver for receiving data transmitted from a host computer as received data via a host-computer interface, the received data including journal print data and receipt print data;

a journal-data-extraction unit for extracting journal print data from the data received by the receiver;

a nonvolatile memory circuit for storing the journal print data extracted by the journal-data-extraction unit;

a transmitted-data extraction unit for extracting data to be transmitted to the printer from the data received by the receiver;

a transmitter for transmitting the transmitted data extracted by the transmitted-data extraction unit to the printer via a printer interface;

a transmit-command accepting unit for accepting a transmit-command input for transmitting the journal print data stored in the nonvolatile memory circuit to the printer from the host computer via the receiver; and a transmitter control unit for transmitting the journal print data stored in the nonvolatile memory circuit via the transmitter when the transmit-command-input is accepted by the transmit-command accepting unit.

12. An interface board which is inserted into an interface board slot of a printer, comprising:

a receiver for receiving data transmitted from a host computer as received data via a host-computer interface, the received data including journal print data and receipt print data;

a journal-data-extraction unit for extracting journal print data from the data received by the receiver;

a nonvolatile memory circuit for storing the journal print data extracted by the journal-data-extraction unit;

a transmitted-data extraction unit for extracting data to be transmitted to the printer from the data received by the receiver;

a transmitter for transmitting the transmitted data extracted by the transmitted-data extraction unit to the printer via a printer interface; and a journal-data-transmit-command extraction unit for extracting from the received data received via the receiver a transmit command to transmit the journal print data stored in the nonvolatile memory circuit to the host computer, wherein the journal-data-transmit-command extraction unit transmits the journal print data stored in the nonvolatile memory circuit to the host computer, when the journal-data-transmit command extracting unit extracts the journal-transmit-command.

13. An interface module which is inserted into an interface board slot of a printer, comprising:

receive means for receiving data from a host computer, the data including journal print data and receipt print data;

journal-data extract means for extracting journal print data from the data received by the receive means;

a nonvolatile memory circuit for storing the journal print data extracted by the journal-data extract means;

transmitted-data extract means for extracting data to be transmitted to the printer from the data received by the receive means;

transmit means for transmitting to the printer the transmitted data extracted by the transmitted-data extract means;

journal-data-transmit-command extract means for extracting a command to transmit the journal print data stored in the nonvolatile memory circuit from the data received by the receive means to the host computer;

transmit means for transmitting the journal print data stored in the nonvolatile memory circuit to the host computer when the transmit command is extracted by the journal-data-transmit-command extract means; and means for transmitting a command that the journal data stored in the nonvolatile memory circuit has been deleted.

14. An interface module which is inserted into an interface board slot of a printer, comprising:

receive means for receiving data from a host computer;

journal-data extract means for extracting journal print data from the data received by the receive means;

a nonvolatile memory circuit for storing the journal print data extracted by the journal-data extract means;

transmitted-data extract means for extracting data to be transmitted to the printer from the data received by the receive means;

transmit means for transmitting to the printer the transmitted data extracted by the transmitted-data extract means;

means for deciding whether the journal print data is stored in the nonvolatile memory circuit;

journal-data-transmit-command extract means for extracting a command to transmit the journal print data stored in the nonvolatile memory circuit from the data received by the receive means to the host computer;

transmit means for transmitting the journal print data stored in the nonvolatile memory circuit to the host computer when the transmit command is extracted by the journal-data-transmit-command extract means; and a journal print switch for transmitting the journal print data to the printer when it has been decided that the journal print data is stored in the nonvolatile memory circuit.

15. An interface module as claimed in claim 14, further comprising:

means for receiving error information from the printer when print error occurs during the print operation while the journal print data is being transmitted to the printer before being printed on journal paper by the printer.

* * * * *